UNITED STATES PATENT OFFICE.

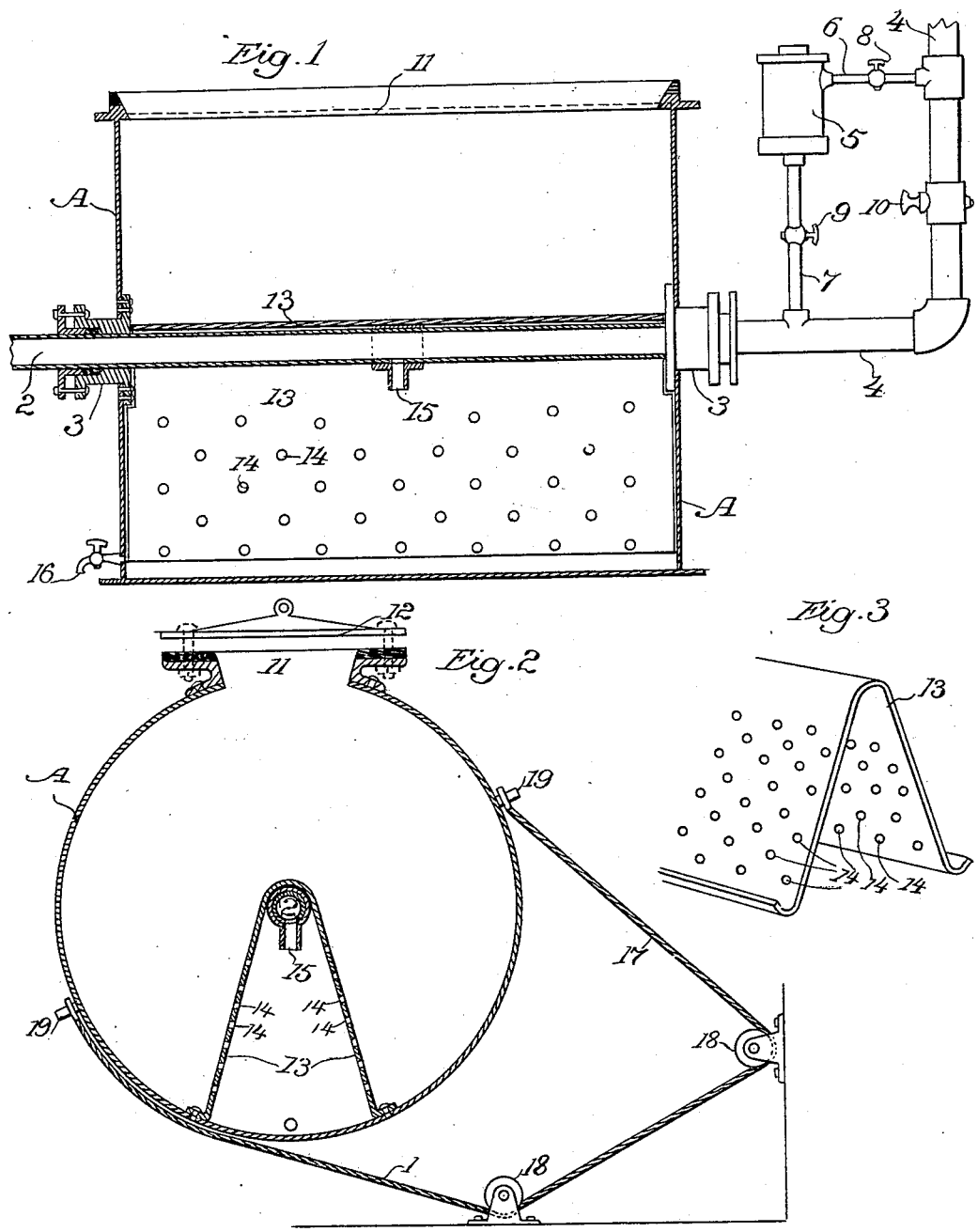

CHARLES E. HALE, OF ALAMEDA, CALIFORNIA, ASSIGNOR TO THE J. K. ARMSBY COMPANY, OF CHICAGO, ILLINOIS.

APPARATUS FOR STEAMING AND SPICING DRIED FRUIT.

SPECIFICATION forming part of Letters Patent No. 676,608, dated June 18, 1901.

Application filed January 18, 1901. Serial No. 43,735. (No model.)

*To all whom it may concern:*

Be it known that I, CHARLES E. HALE, a citizen of the United States, residing at Alameda, county of Alameda, State of California, have invented an Improvement in Apparatus for Steaming and Spicing Dried Fruit; and I hereby declare the following to be a full, clear, and exact description of the same.

My invention relates to an apparatus which is especially designed for steaming or steaming and spicing dried fruits of any description which are capable of such treatment.

It consists, essentially, of a journaled drum having hollow shafts and trunnions for the admission of steam and, if desired, the spicing medium and a perforated hood within the drum over and around which the fruit is contained and through which the steam and other products are delivered, so as to clean and permeate and be absorbed by the fruit. A suitable opening is made in the upper part of the drum for receiving and discharging the contents, and means are employed for tilting and revolving the drum from its normally upright position to carry the discharge-opening to a point where the contents can be emptied.

It also comprises details of construction, which will be more fully explained by reference to the accompanying drawings, in which—

Figure 1 is a general view of the apparatus, partly shown in section. Fig. 2 is a lateral central section through the fruit-containing vessel. Fig. 3 is a detail view of the hood.

This apparatus is designed for the steaming and preparation of dried prunes or other fruits of any description, so as to clean, change, and improve the flavor of the fruit.

Prunes and similar fruits are ordinarily prepared for the market by first grading the fresh fruit, then dipping it into an alkaline solution, and sometimes pricking the skins by sharp points, after which the fruit is dried and placed in a marketable condition. At this stage or at any time after drying has been thus completed the prunes are subjected to the operation which is herein described for the purpose of cleaning and improving their flavor, which is done by subjecting them to steam and in conjunction therewith, if desired, with flavoring materials of any description. This flavoring I have described under the general name of "spicing." It may include the introduction of cinnamon, allspice, cloves, nutmeg, mace, almond, pepper, or vanilla, or other flavors which are not strictly called "spices," but for which I use as a generic term the word "spicing."

The apparatus here shown and described consists of a containing vessel A, which for convenience may be made in the form of a cylinder of any suitable size and material. This cylinder is mounted upon trunnions in suitable bearings, (not here shown,) and the shaft 2 is here shown as tubular, extending through suitable stuffing-boxes or trunnions, as at 3, whereby the escape of steam or other fluids from the interior can be prevented. This shaft is connected at one end with a pipe 4, leading to any source from which the necessary steam or hot water can be obtained. It is preferable to use steam in this connection as being more effective, cleansing, and more thoroughly permeating the fruit. In connection with this I have shown a chamber 5, adapted to contain the spicing or equivalent flavor, and this is connected by a pipe 6 with the steam-pipe 4, and a second pipe 7 connects it with the hollow shaft which enters the containing-chamber A. By means of cocks at 8 and 9 connection with this chamber may be cut off, and by means of the cock 10 the steam or fluid is allowed to pass directly from the pipe 4 into the tubular shaft and thence into the interior of the chamber without passing through the spice-chamber 5. When it is desired to pass the steam through the spice-chamber, the cocks 8 and 9 are opened and the cock 10 is closed to any desired extent, so that the steam will pass through this chamber and will then carry its contents or flavors into the containing-chamber A. This chamber A has upon one side, which is normally the top, an opening, as at 11, and a closing-cover 12, with suitable gasket and bolts or other locking devices whereby it is secured in place. Through this opening when the cover is removed the fruit of whatever description may be introduced.

The process as here described is applied to the treatment of prunes.

In the lower part of the chamber A and opposite to the opening 11 is an inverted-V-shaped hood 13, the upper curvature of which passes over the shaft 2 and the lower divergent edges being turned outwardly and bolted or otherwise secured to the inner periphery and bottom of the chamber A. The sides of this hood are perforated, as shown at 14. The pipe 2 has one or more nozzles 15 opening into the interior of this hood, so that steam or vapor which is introduced through the pipe or shaft 2 will pass out into the hood through these openings and will thence be discharged through the perforations into the mass of fruit which covers and surrounds the hood. The steam causes the fruit to swell and fill out, and during this operation the fruit is cleaned and absorbs a large portion of the moisture and any flavoring which may be introduced therewith.

The quantity of steam or vapor introduced may be so regulated by the controlling-cocks that only so much will be introduced as will be absorbed by the fruit; but any surplus that may happen to condense or remain in the lower part can be drawn off at any time by means of a cock, as at 16.

When the treatment of the fruit has been completed, the apparatus can be turned so that the opening 11 will be presented downwardly and the fruit can be discharged therefrom. This turning may be effected in various ways. It might be done by means, as here shown, of a rope or chain 17, passing over guide-pulleys, as at 18, and having its ends connected with suitable attachments 19 upon the sides of the drum, so that by applying power to the chain 17 to move it in one direction the opening 11 will be brought to the top of the apparatus, and by applying the power to pull the chain in the other direction the cylinder will be turned sufficiently to bring the mouth into position for discharge of the contents.

Having thus described my invention, what I claim as new, and desire to secure by Letters Patent, is—

1. An apparatus for cleansing and spicing dried fruit including a containing-chamber for the fruit, a perforated pipe extending into the chamber, and a hood within the chamber having its upper portion inclosing said pipe said hood being perforated to permit the vapor delivered from the pipe to be discharged into the mass of fruit which covers and surrounds the hood.

2. An apparatus for cleansing and spicing dried fruits including a containing-chamber for the fruit, a perforated pipe extending into said chamber, and an inverted, substantially V-shaped hood fixed within the chamber, having its upper curvature to fit over the pipe and its sides perforated whereby the vapor delivered into the chamber passes through the perforations and into the mass of fruit which covers and surrounds the hood.

3. An apparatus for cleansing and spicing dried fruits including a containing-chamber, a perforated steam-pipe passing into the same, an inverted hood, substantially V-shaped in cross-section and having foraminous walls, said hood being fixed within the chamber so that its upper curvature incloses the pipe, and means for impregnating the steam with flavoring matter before the vapor is delivered into the hood whereby the fruit is treated in the presence of flavored steam.

4. In an apparatus for spicing or flavoring fruits, the combination of a fruit-containing chamber, a vapor-inlet into said chamber, a chamber containing a flavoring material, and means for directing the vapor through the flavoring material before said vapor reaches the vapor-inlet of the fruit-containing chamber.

5. The combination of a fruit-containing chamber, a perforated steam-pipe passing into the same, a perforated hood-shaped chamber in the fruit-chamber and into which the steam is first delivered, a chamber containing flavoring material, inlet and outlet connections between the flavoring-chamber and the steam-pipe, and means for directing the flow of steam through the flavoring-chamber before it reaches the hood-shaped chamber whereby the steam is impregnated with flavoring material before it is delivered to the fruit.

In witness whereof I have hereunto set my hand.

CHARLES E. HALE.

Witnesses:
CHARLES L. LATHROP,
J. R. HAMILTON.